United States Patent [19]

Ng et al.

[11] Patent Number: 4,476,463
[45] Date of Patent: Oct. 9, 1984

[54] DISPLAY DEVICE HAVING UNPATTERNED TOUCH DETECTION

[75] Inventors: Henry H. Ng, Chestnut Hill, Mass.; Béla R. Hatvany, London, England

[73] Assignee: Interaction Systems, Inc., Newtonville, Mass.

[21] Appl. No.: 295,495

[22] Filed: Aug. 24, 1981

[51] Int. Cl.³ .............................................. G09G 1/00
[52] U.S. Cl. ...................................... 340/712; 178/18; 340/709
[58] Field of Search ....................... 340/712, 709, 706; 178/18, 20, 19

[56] References Cited

U.S. PATENT DOCUMENTS

| | | | |
|---|---|---|---|
| 3,047,723 | 7/1962 | Knapp | 250/578 X |
| 3,441,722 | 4/1969 | Gloess | 178/18 X |
| 3,478,220 | 11/1969 | Milroy | 340/712 X |
| 3,673,327 | 6/1972 | Johnson et al. | 340/712 X |
| 3,696,409 | 10/1972 | Braaten | 340/365 C |
| 3,707,715 | 12/1972 | Perotto | 340/712 X |
| 3,758,718 | 9/1973 | Fletcher et al. | 178/18 |
| 3,860,754 | 1/1975 | Johnson et al. | 178/18 |
| 3,906,190 | 9/1975 | Light | 178/18 |
| 3,959,585 | 5/1976 | Mattes et al. | 178/18 |
| 4,053,773 | 10/1977 | Deresh et al. | 250/578 X |
| 4,079,194 | 3/1978 | Kley | 178/18 |
| 4,080,514 | 3/1978 | Pobgee | 178/18 |
| 4,198,623 | 4/1980 | Misek et al. | 340/365 P |

OTHER PUBLICATIONS

TransFlex-The Transparent Touch Switching System from Sierracin, 8 page brochure, Sierracin Corporation, Sylmar, California, May 1, 1980.

*Primary Examiner*—Marshall M. Curtis
*Attorney, Agent, or Firm*—Lahive & Cockfield

[57] ABSTRACT

A display device locates a touch anywhere on a conductive display faceplate by measuring plural electrical impedances of the faceplate conductive coating. The impedances are at electrodes located on different edges of the faceplate. A touch locating circuit determines the location of a touch using known pulsed signals and, in another embodiment, using a tuned measuring signal.

22 Claims, 8 Drawing Figures

DISPLAY DEVICE HAVING UNPATTERNED TOUCH DETECTION

BACKGROUND OF THE INVENTION

This invention provides a display device that responds to, and locates, a touch at essentially any location on a faceplate that overlies the display.

The invention can be used with various display devices of the type which display a number of information items and from which a viewer is to make a selection. One example is a juke box which displays a number of recorded song titles, and a user selects the titles which are to be performed. Another example is an index which accompanies a map, and which illuminates on the map those locations which a user selects. A further example is user selection of information items displayed on the screen of a cathode-ray tube (CRT) terminal that is connected with a computerized information system.

CRT display terminals are known which respond to touch at any of a selected pattern of locations on the display screen. These terminals typically employ a pattern of transparent contacts over the display screen. The terminal responds to touch at any contact in the prescribed pattern and identifies the location of the touched contact. Examples of touch terminals of this nature are disclosed in U.S. Pat. No. 3,696,409 and in the co-pending and commonly assigned U.S. applications for patent Ser. No. 170,056 filed July 18, 1980 and Ser. No. 259,614 filed May 1, 1981.

Another known practice employs a pattern of transparent mechanical switches over a display. Sierracin/Intrex Products in Sylmar, Calif. markets Transflex (TM) brand switches of this type.

It has also been proposed to detect and to locate the touch of a display screen by providing an array of optical sources and detectors around the periphery of the display screen. One alternative is to provide an array of sonic generators and sonic detectors around the periphery of the display screen. In each instance, the sources and detectors are connected with an electronic system that responds to and locates the disturbance which a touch causes in the unbounded spatial energy field. Examples of this and related art include U.S. Pat. No. 4,198,623 and the patents noted therein.

An object of this invention is to provide an improved touch-responsive unpatterned display device. The term "unpatterned" is used herein to characterize a touch-responsive display device that can detect and locate a touch at a location anywhere on the display screen, in contrast to selecting one location from a prescribed set of locations having known, i.e. patterned, locations.

A further object is to provide such a display device that determines the position of a touch without use of an unbounded spatial energy field.

A more particular object is to provide a touch-responsive unpatterned display device that determines the position of a capacitive touch on an electrically-conductive film overlying the display screen.

It is also an object that the display device locate a touch with relatively high reliability.

Another object is to provide a display device of the above character that determines the position of a touch with relatively small spatial ambiguity, that is, with relatively good accuracy and precision.

A further object is to provide a display device of the above character suited for relatively low cost manufacture.

Other objects of the invention will in part be obvious and will in part appear hereinafter.

SUMMARY OF THE INVENTION

A display device according to the invention detects a capacitive touch, such as a touch by a human finger, which occurs anywhere on the display faceplate. The device, moreover, determines the position of the touch on the faceplate. The invention thus provides a display device capable of detecting and of locating a touch on an unpatterned faceplate. The display device typically determines the location of a touch along each of two transverse axes and locates the touch at the small spot, ideally a point, where the two axes intersect.

The mechanism of touch location according to the invention is the change in electrical impedance which a touch introduces to an electrically conductive coating on the display faceplate. Electrically conductive coatings and films which are optically transparent and with which the invention can be practiced are known. They are available, for example, from the Sierracin Corporation in Sylmar, Calif. However, the conductivity, or similarly the resistance, of the coating typically varies from place to place on a given faceplate and varies from faceplate to faceplate. Hence, a consistent, known and repeatable resistance characteristic—as is desired for unpatterned touch location—is not available except when manufactured under unduly costly procedures.

The invention nevertheless attains the location of a capacitive touch to such an electrically-conductively coated faceplate with considerable reliability, accuracy and precision. To this end, the touch locating equipment which the invention provides measures the change in electrical impedance which a capacitive touch introduces to the resistance-capacitance circuit which the conductive faceplace coating forms. The impedance measurement thus examines the electrical time constant of the R-C circuit. The measure typicaly is performed repeatedly from each end of each of two intersecting lineal axes. The resultant four measures are combined to determine the position of the touch.

The illustrated practice of the invention employs a rectangular faceplate having four separate electrodes connected to the conductive coating, one along each of the four faceplate edges. An electrical supply applies a measuring signal to one electrode. The resultant voltage at the electrode is applied to a measuring circuit for providing a measure of the distance from the electrode to any touch of the faceplate. A repeat of this measurement at the electrode on the opposite side of the faceplate provides further information which is combined with the information from the first measurement to determine the location of the touch along the axis which extends between the two electrodes. Performing the same measurements again from each of the remaining two electrodes additionally locates the touch along a second axis, and the intersection of the two axes defines in full the location of the touch.

One embodiment of this technique employs an alternating measuring signal. The signal frequency is changed to attain a selected condition of the resultant voltage waveform being monitored at the electrode which receives the measuring signal. The source frequency that yields the selected condition identifies the desired measure of touch location from the energized electrode.

Another embodiment of the invention employs a direct current measuring signal having two successive selectively-timed values. The resultant voltage at the energized electrode provides the desired measure of touch location relative to that electrode. More particularly, the first value of the measuring signal charges to a known level any capacitance coupled with the faceplate coating. The second signal value partially discharges the capacitance through the resistance of the faceplate coating. The voltage thereafter remaining on the electrode identifies the location of a capacitive touch from that electrode.

A feature of both embodiments is that the faceplate has an electrically-conductive coating that is exposed to be touched and that is continuous along at least one direction in which a touch is to be located. In both illustrated embodiments, a touch is to be located along two transverse directions and the coating accordingly is continuous along the two directions.

The method according to the invention of locating a capacitive touch to a conductive faceplate coating includes measuring impedances of the faceplate coating and comparing the measures to reference values measured when no touch is present. According to one such practice, the impedance of the faceplate coating is measured from each electrode at a time when no touch is detected as present. The reference measurement can be performed separately from each electrode and with a capacitance of known value applied to another electrode. The reference measures obtained in this manner, which can be updated periodically throughout operation to account for changing operating conditions and thereby to enhance the accuracy of measurement, can be stored in a random access memory connected with a microprocessor. In this instance, the microprocessor compares the reference values with similar measurements made when a is detected, and determines with significant accuracy and reliability the location of the touch on the faceplate.

The invention accordingly comprises the several steps and the relation of one or more of such steps with respect to each of the others, and the apparatus embodying features of construction, combinations of elements, and arrangements of parts adapted to effect such steps, all as exemplified in the following detailed disclosure, and the scope of the invention is indicated in the claims.

BRIEF DESCRIPTION OF DRAWINGS

For a fuller understanding of the nature and objects of the invention, reference should be made to the following detailed description and the accompanying drawings, in which.

DESCRIPTION OF ILLUSTRATED EMBODIMENT

Figure 1:
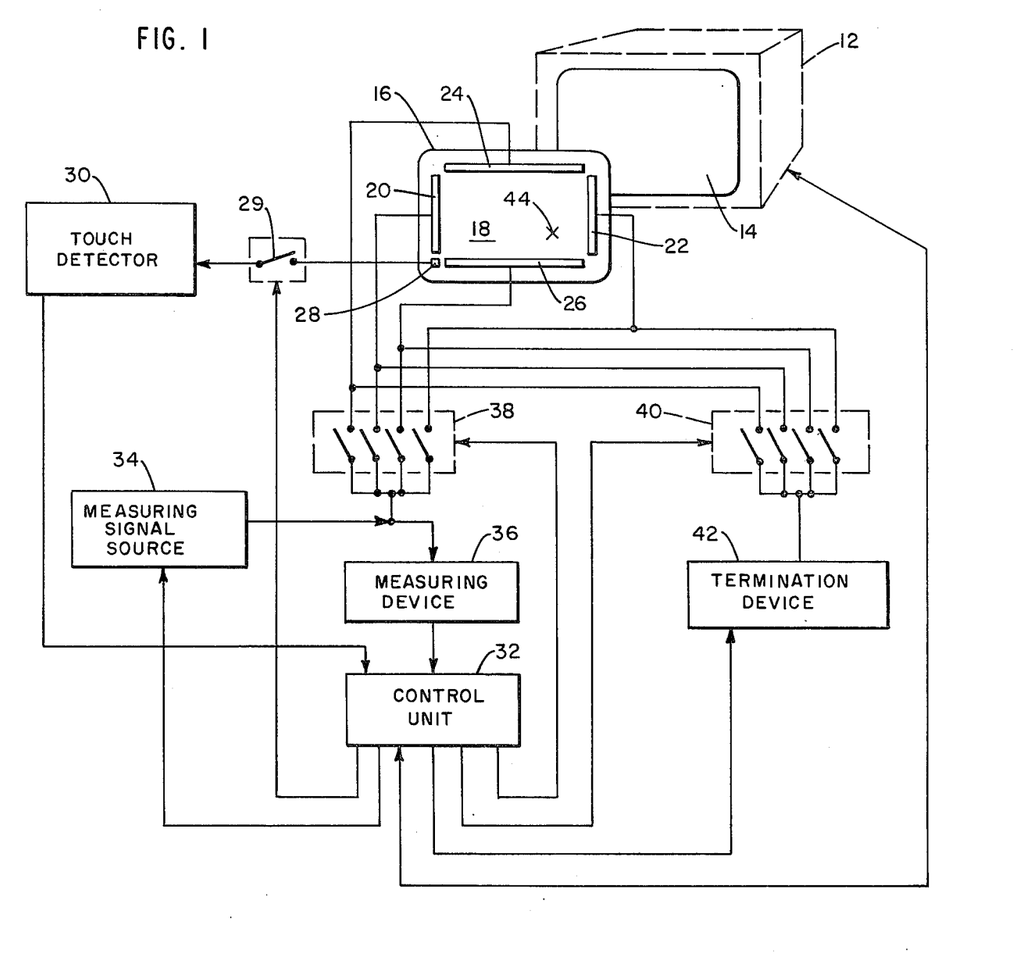
FIG. 1 is a block schematic representation of a display device according to the invention.

A display device according to the invention has, as FIG. 1 shows, a display unit 12 with a display screen 14. The illustrated display unit is a cathode ray tube computer terminal and accordingly the display screen 14 is the face of the cathode ray tube. An optically-transparent faceplate 16 is affixed to the terminal over the screen 14. The faceplate has an electrically-conductive coating 18 over its entire outer surface which overlies the screen 14. The faceplate coating 18 is unpatterned in that it extends continuously over the entire display screen 14 or over whatever portion thereof is to display user-selectable items.

Four electrodes 20, 22, 24 and 26 are affixed to the faceplate and connected electrically to the coating 18. The electrodes 20 and 22 are at the opposite horizontally-separated peripheral side edges of the faceplate and are elongated to extend along the faceplate edges opposite to and parallel with one another. The other pair of electrodes 24 and 26 likewise are vertically spaced apart at opposite peripheral side edges of the faceplate opposite and parallel with one another. The electrodes are fixed to the faceplate to be at known locations relative to the terminal screen 14 so that the determination of a location on the faceplate 16 relative to the four electrodes 20–26 corresponds in known manner to a location on the display terminal screen 14.

The illustrated touch-locating system uses the two pairs of opposed electrodes 20–22 and 24–26 for determining the location of a touch to the faceplate 16. A further electrode 28 is illustrated connected anywhere to the coating 18 for connection by way of a single-pole single-throw switch 29 to a separate touch detector 30. The electrode 28 is shown separate for clarity of illustration but can be omitted and the detector 30 connected instead to any measuring electrode 20, 22, 24, 26. The detector 30 determines, by the connection of electrode 28 to the faceplate coating 18 and with switch 29 closed, whether the faceplate is being touched. This determination is independent of the location of the touch. The touch detector 30 applies to a control unit 32 a signal which identifies whether a touch is being detected anywhere on the faceplate.

With further reference to FIG. 1, a measuring unit illustrated as employing a measuring-signal source 34 and a measuring device 36 can connect to any measuring electrode 20, 22, 24 and 26 by way of an analog switch 38. The illustrated switch 38 employs in effect four independently operable single-pole, single-throw switch stages and operates the switch stages, which are shown in the normally open position, in response to signals it receives from the control unit 32.

A further analog switch 40, illustrated as in principle the same as switch 38, responds to a further signal from the control unit 32 to connect a termination device 42 to any of the measuring electrodes.

During typical operation of the touch-responsive display system of FIG. 1, the display terminal 12 displays information on the screen 14 using conventional practices and in a manner which is conventional except that the location of user-selectable information items is free of constraints such as were heretofore imposed by a patterned touch capability.

The touch detector normally continuously examines the electrical capacitance of the faceplate coating 18 to determine whether the coating is being touched. For this purpose, the touch detector can employ a preferred construction described hereinafter or known practices, including those identified above with reference to conventional CRT touch-responsive display terminals.

At times when the touch detector 30 signals that there is no capacitive touch to the faceplate 16, the control unit 32 operates the measuring unit formed by the source 34 and the measuring device 36 and the termination device 42, to obtain and update reference information regarding the electrical impedances which the faceplate coating 18 presents to the measuring electrode 20, 22, 24 and 26. For this and other control unit operations, the control unit 32 can employ a programmable microcomputer having a conventional complement of processing, memory, and I/O control units.

When a person applies a touch—designated with an "x" 44—to the faceplate coating, the control unit 32 responds to the resultant touch-reporting signal from the detector 30 to obtain a measure of the electrical impedance which the touched faceplate 16 presents to each measuring electrode 20, 22, 24 and 26. The control unit compares each such measured impedance to a corresponding reference measure to identify the location of the touch 44 from each measuring electrode. The measures made with the opposite electrodes 20 and 22 identify the location of the touch along the horizontal axis extending between these two electrodes. Similarly, the two identifications of touch location made relative to the vertically-spaced electrodes 24 and 26 identify the location of the touch along the vertical axis between the latter electrodes. These determinations of touch location along the two transverse axes identify a single spot on the faceplate 16 where the touch 44 occurs. This location of a touch to the faceplate 16 identifies to the control unit 32 which informational item being displayed on the terminal 12 the user has selected. The display system responds in a known manner to this determination of user selection.

Figure 2:
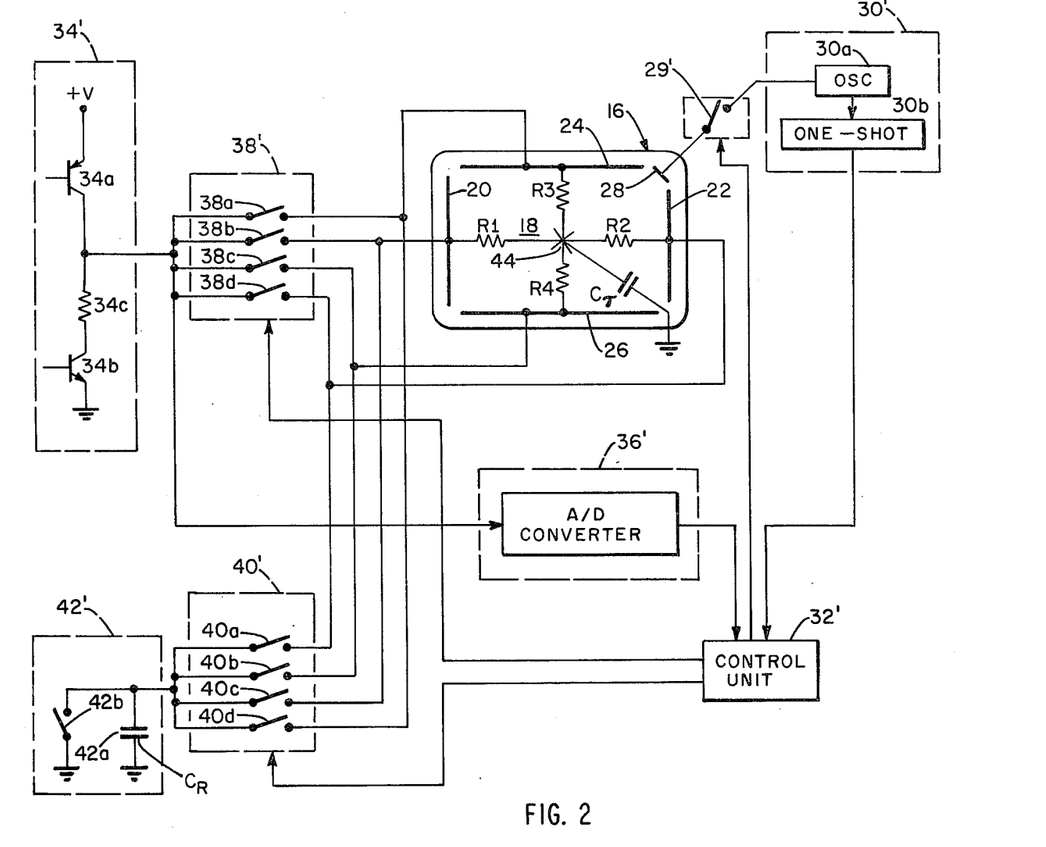
FIG. 2 is a block schematic representation of a display device according to FIG. 1 for practice of the invention with a switched direct current measuring signal.

FIG. 2 shows a touch detection and location system according to FIG. 1 which locates a capacitive touch to the display faceplate 16 by a measure of the resistance-capacitance time constant at each measuring electrode 20, 22, 24 and 26. (The faceplate 16 and the coating, the electrodes and the touch 44 bear the same reference numerals in FIG. 2 as in FIG. 1. Other elements of the FIG. 2 system which correspond to FIG. 1 bear the same reference numeral plus a superscript prime.) The drawing shows the touched faceplate 16 as having an impedance which includes a resistive component designated R(1) between the touch 44 and measuring electrode 20 and, likewise, a resistive component R(2) between the touch numeral 44 and the opposite measuring electrode 22. The touch introduces a shunt capacitance C(T) shown in circuit between the touch 44 of the faceplate coating and ground. The electrical impedance of the faceplate conductive coating can further be represented as including series resistive components R(3) and R(4) in circuit, respectively, between the measuring electrode 24 and the touch 44 and between the measuring electrode 26 and the touch 44.

Figure 2A:
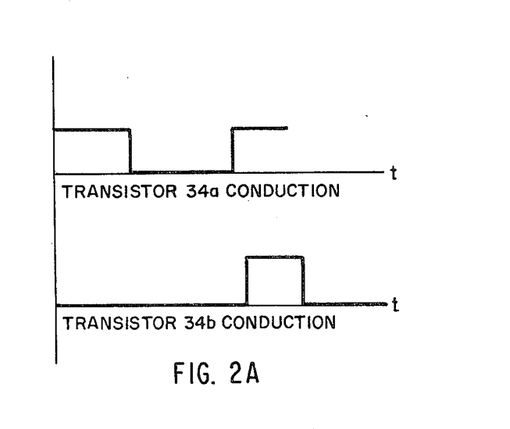
FIG. 2A shows electrical waveforms illustrating operation of the display device of FIG. 2.

The illustrated measuring signal source 34' for the system of FIG. 2 develops two successive direct current signals for each impedance-measuring, and correspondingly touch-locating, operation. One signal, produced for example by turning on a normally nonconducting transistor 34a in the source and illustrated with the upper waveform in FIG. 2A, applies current to one measuring electrode as selected with the switch 38'. This current charges the capacitance of the faceplate coating, including the capacitance of the touch 44, through the resistance of the coating. The second signal illustrated with the lower waveform in FIG. 2A, produced by turning on a further normally nonconducting transistor 34b in the source, provides a known discharge path, through the coating resistance and the conducting transistor 34b and the current limiting resistor 34c in series with it, from the charged capactive impedance of the faceplate.

The measuring device 36' for the FIG. 2 system employs an analog-to-digital converter. The converter is connected with the measuring electrodes 20, 22, 24 and 26 by way of the switch 38' to receive the voltage at each measuring electrode following the foregoing charge and discharge operations, and converts the analog value of the voltage to a binary value for application to the control unit 32.

The termination device 42' for the system of FIG. 2 includes a reference capacitor 42a with a value designated as C(R) and includes a normally-open single-pole, single-throw switch 42b. The termination device 42' responds to control unit signals to close the switch 42b for discharging capacitive impedances associated with the faceplate conductive coating.

One operating sequence for this D.C. based system of FIG. 2 includes opening switch 29' and switch 38' and closing all states of the switch 40' and the switch 42b to discharge the capacitance of the faceplate coating 18; after which the switch 42b and the switch 40' stages are returned to the normally open condition shown. The control unit 32' next closes the switch stage 38b, and operates the source 34' to charge fully the capacitive impedance presented at the measuring electrode 20, and then partially to discharge that capacitive impedance for a known selected brief time. The A-to-D converter of the measuring device 36' receives the resulting voltage at the measuring electrode 20 through the switch stage 38b, and applies it to the control unit 32'.

The resultant digital voltage signal applied to the control unit 32' when a touch 44 is present provides a unique identification of the distance of that touch from electrode 20 as measured along the spacing between the electrodes 20 and 22. The system performs similar measurements at each of the three other measuring electrodes 22, 24 and 26 by closing, one at a time, the switch stages 38d, 38a and 38c, respectively.

The operation further includes a series of initializing measurements made at a time when no touch is present and switch 29' is open. For this purpose, the control unit 32' applies the successive charge and discharge signals to each measuring electrode, one at a time, and simultaneously applies the known reference capacitance C(R) to the opposite measuring electrode by way of the switch 40'. The measures obtained in this manner provide reference values of the resistive-capacitive impedance which the faceplate coating presents to each measuring electrode in the absence of a touch. The reference measures include stray capacitances of whatever nature, and account for environmental conditions such as temperature and humidity.

With further reference to FIG. 2, the illustrated touch detector 30' employs an oscillator 30a and a retriggerable one-shot or astable multivibrator 30b. The frequency selecting, tuning stage of the oscillator 30a is connected to the faceplate coating through switch 29' by way of the electrode 28 so that the oscillator frequency changes when the faceplate is touched, and again when a touch is removed. In the illustrated embodiment, the oscillator frequency decreases measurably when the faceplate is touched, and correspondingly increases when a touch is removed. The output signal from the oscillator triggers the one-shot multivibrator to switch from the stable state to the astable state. The multivibrator automatically switches back to the stable state after a selected known duration, unless it receives another triggering signal while still in the astable condition. The duration of the astable state is longer than the oscillator period when the faceplate is not touched, but is shorter than the period of the oscillator during a touch correlation. The output signal from the one-shot multivibrator 30b is applied to the control unit 32'.

When the faceplate coating 18 is not touched and the oscillator output signal has the selected relatively fast frequency normal for the no-touch condition, the oscillator pulses occur sufficiently rapidly to trigger the one-shot multivibrator 30b repeatedly so that it remains in the astable condition. The output signal from the multivibrator accordingly remains at the level indicative of the astable state. The control unit 32' recognizes that signal condition as reporting a no-touch condition. When, however, the faceplate coating is touched, the oscillator frequency decreases to such an extent that the period between successive oscillator pulses is longer than the astable period of the multivibrator 30b. The multivibrator accordingly switches back and forth, between the stable and astable states, and the output signal which it applies to the control unit 32' changes correspondingly between two selected values. The control unit recognizes this changing signal as indicative of a touch condition.

The astable multibrator preferably includes one or more control elements for adjustably changing the duration of the astable state, as is known for devices of this type. These elements can be controlled, preferably electronically, to accommodate changes and variations, such as in operating temperature and humidity and in the equipment with which the multibrator operates in the system of FIG. 2.

The FIG. 2 control unit 32' controls the elements of the system to locate a touch of the faceplate coating 18 with a succession of initializing reference measures and a succession of locating measures. The switch 29', which is closed for touch detection, preferably is open during these measures. The initializing measures are performed when the touch detector 30' determines that no touch is present anywhere on the faceplate 16, and produce reference values of the electrical impedance at each measuring electrode. The locating measures determine the impedance presented to each electrode for a particular touch. The control unit compares the locating measures with the reference values to locate a touch relative to the measuring electrodes.

Figure 3:
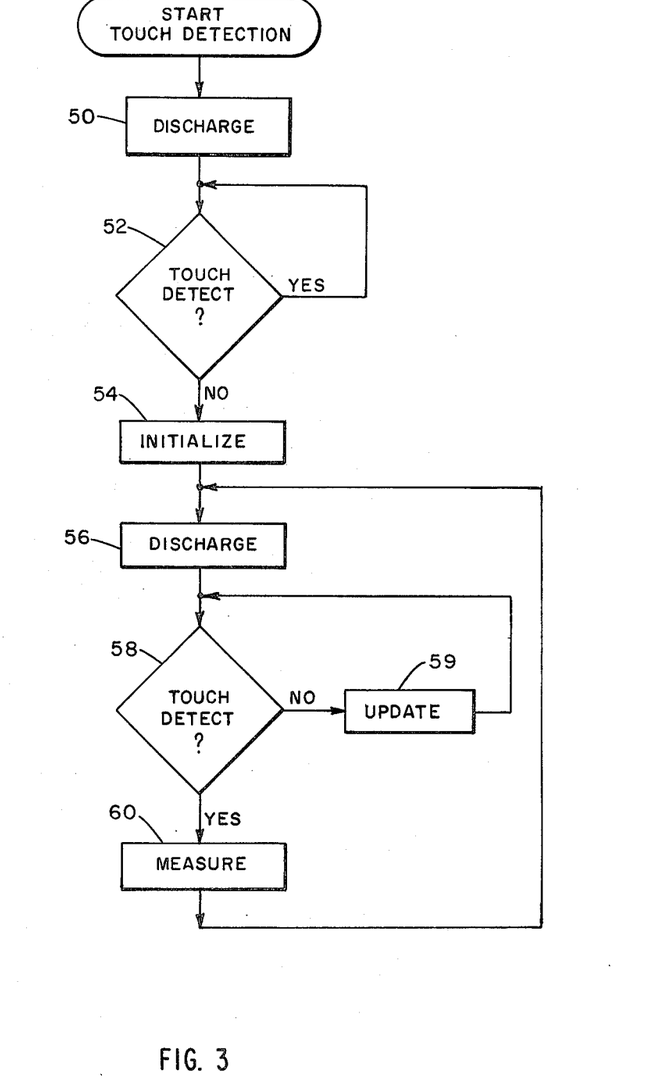
FIGS. 3, 4 and 5 are flow charts of touch locating operation with the embodiment of FIG. 2.

The flow chart of FIG. 3 illustrates one operating sequence which the control unit 32' of FIG. 2 provides for this purpose. The operation commences, as designated with action box 50, with a two-step discharge operation. In the first step, the control unit opens the touch-detect switch 29 and all stages of the measuring switch 38, closes all stages of the termination switch 40 and closes the discharge switch 42b. These operations discharge the capacitance coupled with the measuring electrodes by connecting the electrodes to the ground return path through the switches 40 and 42b. In the second step, all stages of switches 38 and 40 are opened, as is switch 42b, and the touch-detect switch 29 is closed. The control unit 32 then responds to the touch detector 30' to determine whether a touch is detected, decision box 52. When a touch is detected at this initial point in the operating sequence, no action is taken. However, when no touch is detected, the control unit proceeds to initialize the system as indicated with action box 54 and discussed further below with reference to FIG. 4.

The next operation is to repeat the discharge operations of action box 50, as shown with action box 56, and to again monitor whether a touch is detected, decision box 58. When no touch is detected at this juncture, the illustrated system performs an update operation, action box 59, to adjust the initialized reference values to account, for example, for changes in temperature humidity, or operating voltages. (The update operation can be similar to the initialize operation and is not discussed further.) On the other hand, when a touch is detected, the operation proceeds to a measuring sequence as designated with action box 60 and as described further below in the reference to FIG. 5. Upon completion of the measuring operation, the operation returns to discharge operations of action box 56 and to the detection of another touch, decision box 58.

Figure 4:
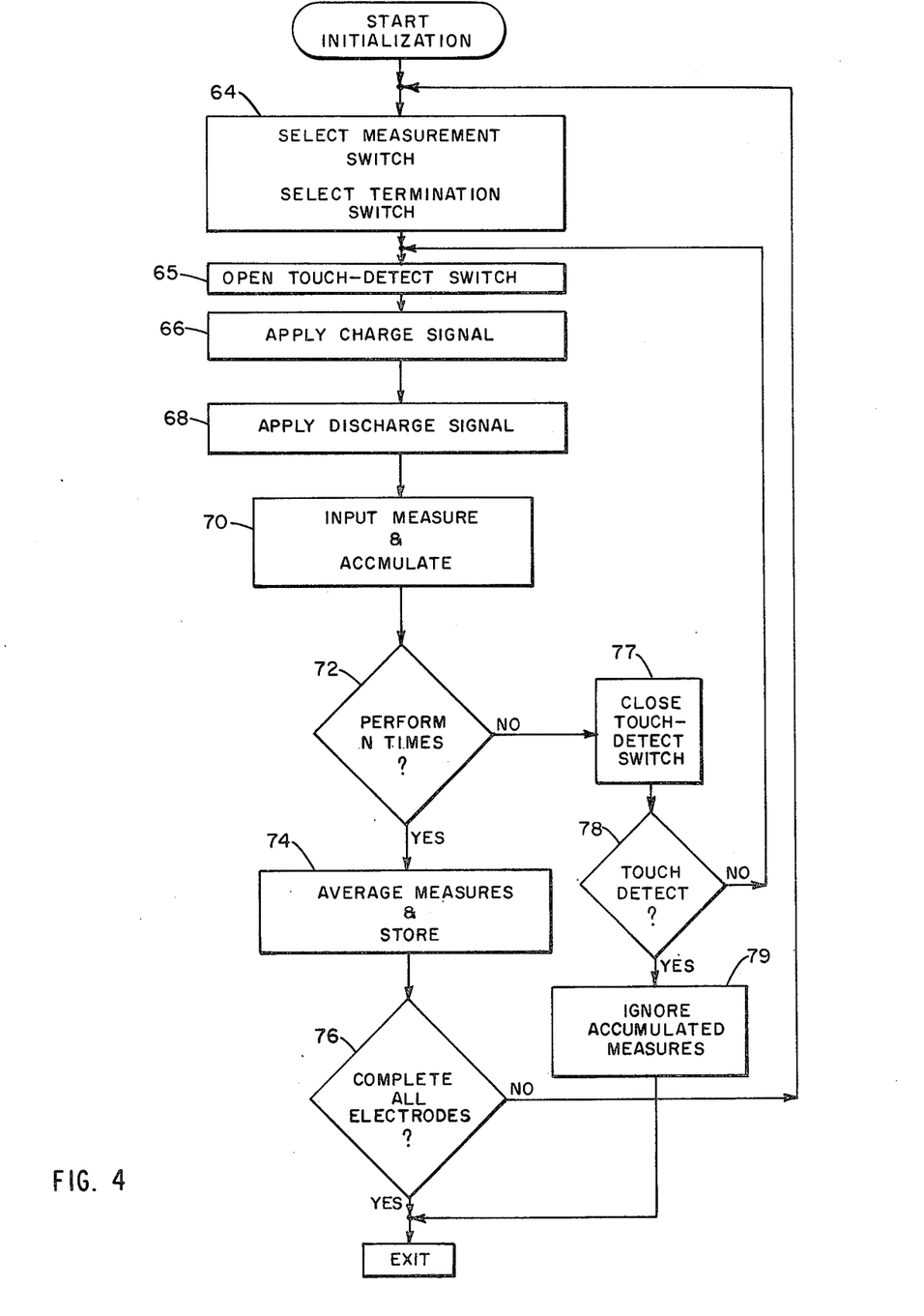

FIG. 4 illustrates one control unit 32' sequence for the initialize operation of action box 54 in FIG. 3. This initializing operation commences with the connection of one measuring electrode to the reference capacitor C(R), action box 64, by closing the associated stage of the measurement switch 38' and the associated stage of the termination switch 40'. The illustrated control unit at this juncture closes the switch stages connected with opposite measuring electrodes, e.g. closes the switch stages 38b and 40a (FIG. 2) which are associated with the opposed electrodes 20 and 22, as one example. The operation proceeds to open the touch-detect switch 29, action box 65, and to the application of the charge signal from the measuring signal source 34', action box 66, to charge to a selected known voltage the capacitive impedance presented to the selected measuring electrode. This capacitive impedance includes the reference capacitor C(R), and the capacitance of the faceplate coating in the absence of a touch. The control unit next applies the discharge signal from the source 34', action box 68, and reads in the resultant voltage as measured by the analog-to-digital converter 36', action box 70. The control unit typically accumulates the measured voltage with any prior measures made for the same measuring electrode. The control unit repeats the signal-applying and measurement-inputing steps a selected number (n) of times, as determined with decision box 72. The illustrated operating sequence proceeds to average the (n) accumulated measures and store the average value, action box 74. At this juncture, the system has determined a reference measure of electrical R-C impedance of the coating on the display faceplate 16 as presented to one of the four measuring electrodes and has stored it, typically in a random access memory portion of the control unit 32'.

The operating sequence proceeds to repeat the foregoing reference-measuring operations with a different measuring electrode, i.e. repeats the actions of box 64 by closing a different stage of the measuring switch and closing the termination switch stage associated with the opposite electrode, and proceeds again through the sequence of FIG. 4. When this operating sequence has been performed for all four measuring electrodes, as determined with decision box 76, the initializing sequence is complete and the operating exits, i.e. returns to action box 56 of the FIG. 3 sequence.

The foregoing initializing sequence can, where desired, include steps to monitor if the faceplate is touched while the sequence is being performed. This is illustrated with action box 77, decision box 78 and action box 79. The control unit 32' can respond to detection of a touch at this time, action box 78, by exiting from the initializing sequence as illustrated, or take other appropriate action to make certain that the measurement of reference values only occurs when the faceplate is free of any touch.

Figure 5:
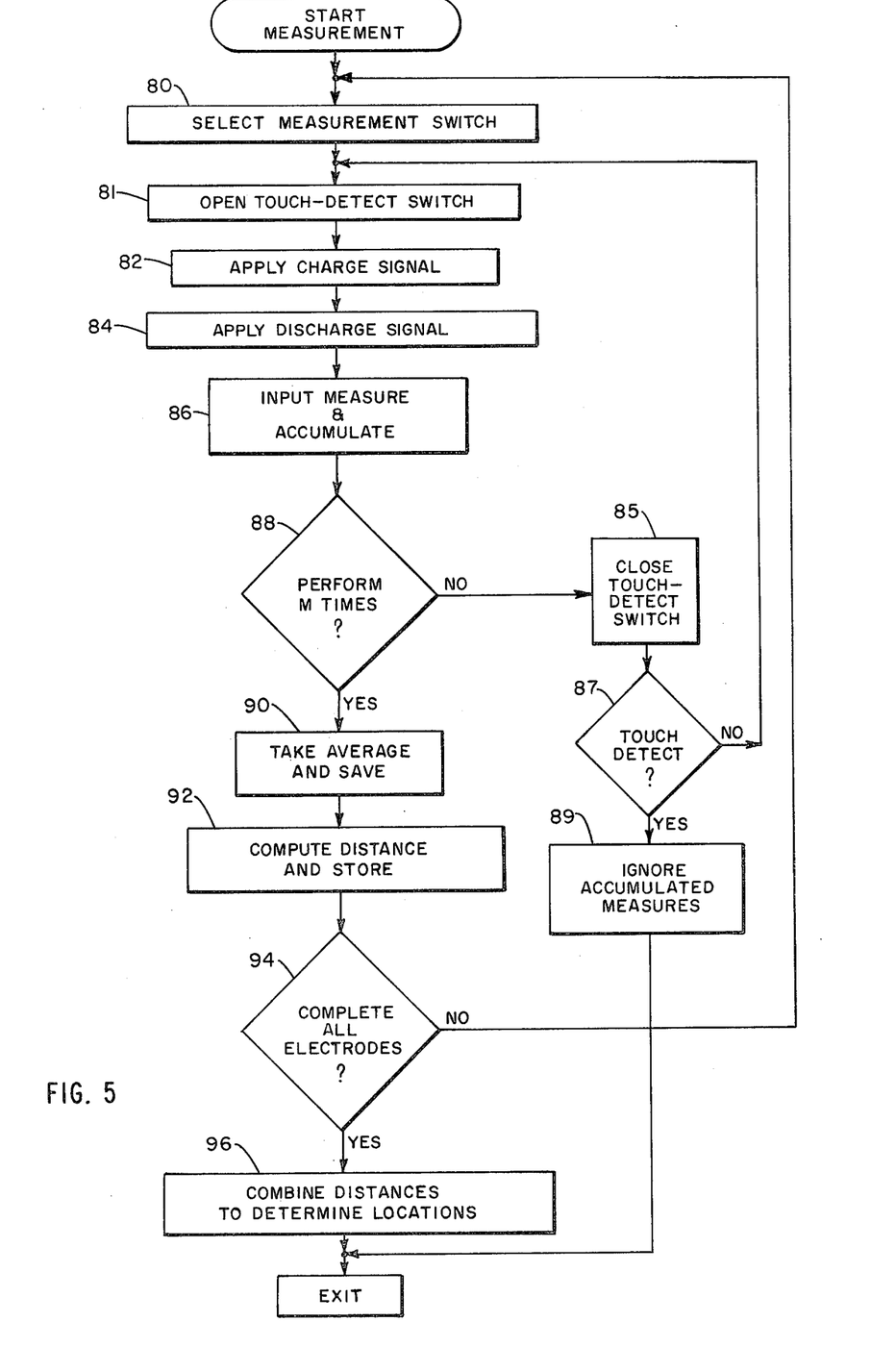

FIG. 5 illustrates one sequence for the measuring operation of action box 60 in FIG. 3. This sequence commences with the selection of one measuring electrode and the closing of the associated stage of the measurement switch, action box 80. The operation applies the source 34' charge signal to the selected measuring electrode, action box 82, and applies the selected partial discharge signal, action box 84. The resultant voltage at the measuring electrode is then applied, after conversion with the converter 36', to the control unit and accumulated with any prior measurements made that same electrode, action box 86. The illustrated sequence performs this measurement a known multiple (m) times, as determined with action box 88 and the illustrated no-touch verification or exit sequence of boxes 85, 87 and 89, after which the control unit computes and saves the average of the accumulated measures, action box 90, for determining from the resultant the distance of a touch from the electrode at which the foregoing measurements were made. The operation is repeated for each of the four measuring electrodes 20, 22, 24 and 26, with a different corresponding stage of the measurement switch 38' closed during each repeat.

When this operation is completed for all electrodes, as determined with decision box 94, the operation proceeds to a final computation, action box 96, which combines the distance determinations resulting from action box 92 to determine the two-coordinate locations of the spot on the display screen where the detected touch is located. Upon completion of the measurement sequence, the operation exits back to the FIG. 3 operation and performs the operations shown for action box 56. The measuring operation of FIG. 5 can include additional steps to verify further a location determination. The operation can also be adjusted as appropriate to determine if the point of touch changes along the faceplate coating. A further variation is to terminate the measuring sequence in the event the touch is removed prior to completion, as determined with the touch detector 30'.

With further reference to FIG. 2, although the discharge switch 42b is shown for clarity of illustration as a separate element, in a preferred embodiment the oscillator 30a of the touch detector 30' includes elements that function as a capacitive discharge stage. One such oscillator is the type 556 integrated circuit oscillator as available from manufacturers such as Texas Instruments and Signetics. When such an oscillator is used, the shunt switch 42b is omitted but a like switch is placed in series between the oscillator and the electrode 28. This switch is closed during touch-detecting operation and is open during measuring operation, both for determining and updating reference measures and for determining touch-locating measures.

Figure 6:
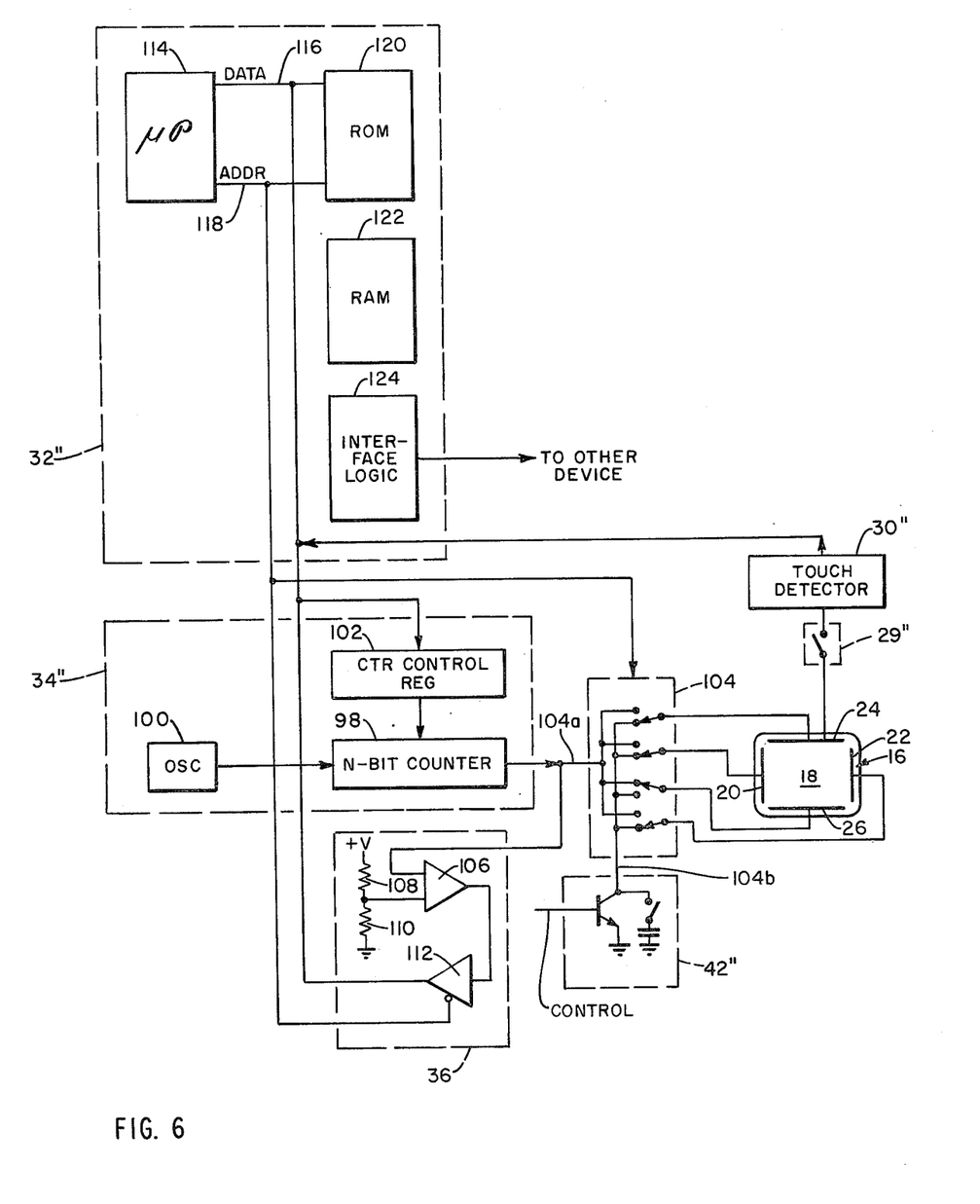
FIG. 6 is a display device according to FIG. 1 for practice of the invention with an alternating measuring signal.

FIG. 6 shows an embodiment of the FIG. 1 touch detection and location system which measures the electrical impedances presented to the faceplate electrodes 20, 22, 24 and 26 by means of an alternating measuring signal. In particular, the measuring signal source 34" produces an alternating or other frequency signal with a frequency that can be changed over a selected range. The illustrated source 34" is a form of variable frequency clock that employs a counter 98 that counts the pulses from an oscillator 100. A counter control register 102 controls the number of counts required to fill the counter 98, which then produce an output pulse. The counter applies this output pulse, which is the impedance measuring signal, to a switch 104 that combines functions of the FIG. 1 measuring switch 38 and terminating switch 40. The illustrated switch 104 has four single-pole, double-throw stages, each of which is arranged for connecting a different one of the four measuring electrodes 20, 22, 24 and 26 to either a switch input line 104a or a switch output line 104b. The output line connects to a termination device 42" which is illustrated as a normally non-conductive transistor discharge switch. In parallel with the transistor is a switch in series with a capacitor; the switch is normally open as shown and is closed by external control only during initialization measures.

The measuring device 36" for the FIG. 6 system employs a differential-amplifier comparator 106, one input of which is connected to the switch terminal 104a, and the other input of which receives a d.c. reference voltage developed from a (+v) supply with two resistors 108 and 110. The measuring device 36" further includes a buffer 112 which can store the output signal from the comparator 106 under control from the control unit 32". The illustrated control unit includes a microcomputer which has a programmable microprocessor 114 connected by way of a data bus 116 and an address bus 118 with a read-only memory 120, a random access memory 122, and an interface logic element 124. The control unit is connected to control the switch 104, to control the measuring buffer 112, and to control the counter control register 102.

The FIG. 6 system further employs a touch detector 30" which suitably is constructed as described hereinabove with reference to FIGS. 1 and 2, and the output of which is connected with the data bus 116.

The overall operation of the a.c. system of FIG. 6 typically includes the discharge of the faceplate coating capacitances by grounding each measuring electrode 20, 22, 24 and 26 by way of the switch 104 and the terminating device 42"; the detection of a touch anywhere on the faceplate by the detector 30" operating through the electrode 28; the obtaining and the updating of reference values of the coating impedances as measured when no touch is detected; the measurement of these impedances when a touch is detected; and the computing of the location of the touch by comparison of the latter impedance measures with the updated reference values. The overall operation thus can be similar to those described above with reference to FIG. 3 for the system of FIG. 2. Further, the reference-obtaining and updating routines, and the measuring routines when a touch is directed can, in general, be similar to that described above with reference to FIGS. 4 and 5, respectively, for the system of FIG. 2. However, the detail of the measurement made at each measuring electrode, whether for reference and updating purposes or for measurement when a touch is present, differs from that described above with reference to the system of FIG. 2, as will now be described with further reference to FIGS. 6 and 7.

Consider, for example, a measurement—whether for reference or updating purposes or for the purpose of locating a detected touch—at the measuring electrode 26. The four stages of the switch 104 are set as shown, to connect the measuring electrodes 20, 22 and 24 to the switch line 104b. Only the measuring electrode 26 is connected through the switch to the line 104a to receive the measuring signal from source 34".

The counter 98 develops the measuring signal with a selected frequency, in response to repetitive countings of oscillator 100 pulses to the value selected by the number in the register 102, and applies it to the switch line 104a. The illustrated control unit 32" loads into the control register 102 a number for producing the measuring signal frequency initially with a value below that where any capacitance coupled to the faceplate coating presents significant shunt loading. Accordingly, the waveform of the measuring signal applied to the switch 104, as loaded by the faceplate impedance presented to the electrode 26, has a waveform essentially identical to that which the source 34" would present to a purely resistive impedance, as shown with the waveform 130 in FIG. 7.

Figure 7:
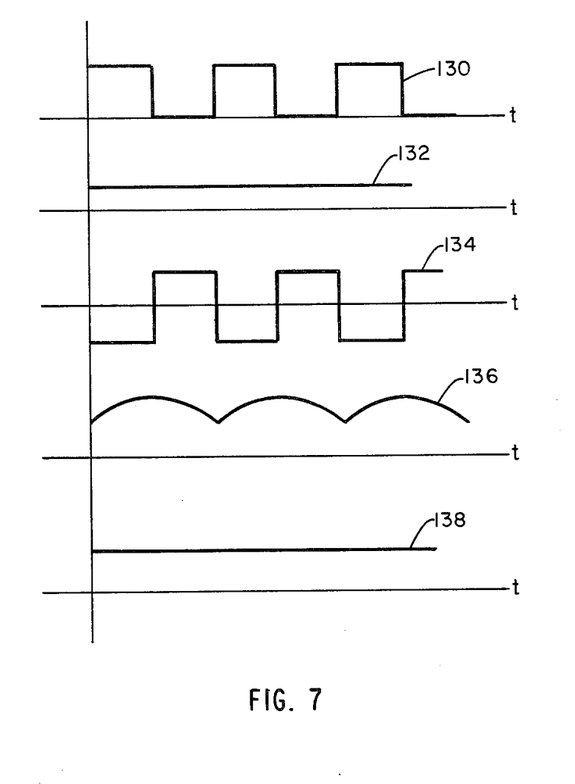
FIG. 7 shows electrical waveforms illustrating the operation of the display device of FIG. 6.

The comparator 106 receives this waveform at one input terminal and receives at the other input terminal a d.c. reference voltage with a level, as shown in waveform 132 of FIG. 7, between the high and low values of the measuring signal of waveform 130. Hence the output from the comparator 106 switches between two selected values, to have a waveform 134, in response to the alteration of the applied measuring signal of waveform 130.

The sampling buffer 112 applies the status signal output from the comparator to the data bus 116 in response to a control signal received on the address bus 118. Upon sensing the alternating character of the status bit from the comparator 106, i.e. with waveform 134, the control unit 32" applies another, typically smaller valued, number to the control register 102 for the purpose of increasing the frequency of the measuring signal.

The control unit 32" continues to increase the frequency of the source 34" in response to receipt of a switching status bit from the comparator 106, by way of the buffer 112. However, as the frequency of the measuring signal increases, the capacitance present at the faceplate coating has increasing effect, and the impedance-responsive waveform applied to the comparator 106 changes progressively from the waveform 130 to the FIG. 7 waveform 136. One feature of this change in the voltage waveform with increasing frequency, is that the minimum voltage increases, due to the storage of charge by the capacitance of the faceplate, including the touch capacitance of touch. When the source 34" frequency is increased to the point where the faceplate capacitance maintains the minimum value of the voltage in waveform 136 above the reference voltage applied to the other input of the comparator 106, the output signal from the comparator no longer switches between two values but rather remains constant. The comparator output signal then has a single value as appears in waveform 138.

In response to this single-valued status signal from the comparator 106, the control unit 32" stores the value of the frequency-determining number in the control register 102. This number identifies the measuring-signal frequency at which the comparator output first became single-valued. It hence provides a basin for comparative measurement of the resistance-capacitance impedance which the touched faceplate presents to the measuring electrode 26.

A comparison of this measure with a like measure made at the opposite electrode 24, and further compared with updated reference measures at the two electrodes 26 and 24, locates the faceplate touch along the vertical separation between them.

A control unit 32" employing a microprocessor 114 as indicated in FIG. 6 can repeat the foregoing measurement at one measuring electrode a selected number of times and determine the average or other selected resultant of the multiple measures, and can perform repetitive like multiple measures at each other measuring electrode, with extreme speed well within the time available when a user touches the faceplate coating to select an informational item being displayed. The control unit 32" readily compares the several resultant frequency-originating measures to locate the touch relative to the four measuring electrodes. This yields a relatively high resolution location of the touch which has considerable accuracy and precision and can readily have high reliability.

The invention has been described with particular reference to performing measurements from each of four measuring electrodes peripheral to the coating area of interest. However, measurements made from each of only two electrodes, each extending in a different direction, e.g. the electrodes 20 and 24, can locate a faceplate touch satisfactorily for some applications. However, measurements made from each of four electrodes, or perhaps three triangularly-arranged electrodes where appropriate, are preferred to attain a touch location with greater resolution and reliability.

As described, the invention can be practiced with an impedance-measuring signal that provides a known capacitance-charging condition, e.g. a known capacitance-charging signal in succession with a known discharge signal. The successive signals produce a charge condition that is a measure of faceplate R-C parameters. An alternative practice provides an alternating measuring signal. For either practice, the system can locate a faceplate touch from a measurement of the response of the faceplate impedance to the measuring signal. Or the system can tune or otherwise adjust a parameter of the measuring signal to attain a prescribed response, and determine the touch location from the final value of that parameter.

It will thus be seen that the objects set forth above, among those made apparent from the preceding description, are efficiently attained. Since certain changes may be made in carrying out the above method and in the constructions set forth without departing from the scope of the invention, it is intended that all matter contained in the above description or shown in the accompanying drawings be interpreted as illustrative and not in a limiting sense.

It is also to be understood that the following claims are intended to cover all of the generic and specific features of the invention herein described, and all statements of the scope of the invention which, as a matter of language might be said to fall therebetween.

Having described the invention, what is claimed as new and secured by Letters Patent is:

1. In a touch-responsive display device having a faceplate, the improvement comprising
   A. at least a first electrode disposed on the faceplate at a known relative location along at least a first direction,
   B. an electrically-conductive coating on said faceplate connected in circuit with said coating and extending continuously therefrom along at least said first direction, said coating presenting to said first electrode an electrical impedance responsive to the relative location along said first direction of a capacitive touch of the faceplate, and
   C. measuring means for applying an impedance-measuring signal of selected character to said electrode, and for responding to the response of said electrical impedance of said faceplate coating to said measuring signal for identifying the location along said first direction relative to said electrode of a capacitive touch of the faceplate.

2. In a display device according to claim 1, the further improvement in which said measuring means includes first means for comparing to a reference condition the response of said coating impedance to said measuring signal.

3. In a display device according to claim 1 the further improvement in which said measuring means includes
   A. means for producing a reference response of said coating impedance to said measuring signal in the absence of any touch, and
   B. means for comparing to said reference response the response of said coating impedance to said measuring signal in the presence of a touch.

4. In a display device according to claim 1, the further improvement in which said measuring means includes means for measuring the magnitude of the voltage developed at said electrode in response to the measuring signal.

5. In a display device according to claim 4, the further improvement in which said measuring means includes means for applying to said electrode a measuring signal having a selected frequency character which includes plural frequency values.

6. In a display device according to claim 4 the further improvement in which said measuring means includes means for producing said measuring signal with different frequency values within a selected range thereof.

7. In a display device according to claim 4, the further improvement in which said measuring means includes means for applying to said electrode a measuring signal having a selected capacitance-charging character.

8. In a display device according to claim 4, the further improvement in which said measuring means includes means for producing said measuring signal with a selected capacitance-charging character in succession with a selected capacitance-discharging character.

9. In a display device according to claim 1, the further improvement in which said measuring means includes means for producing said measuring signal with a selected character and for changing said character to produce a selected response thereto.

10. In a display device according to claim 9, the further improvement in which said measuring means changes the frequency of said measuring signal to produce said selected response.

11. In a display device according to claim 1, the further improvement
    A. comprising a second electrode connected with the faceplate coating and disposed at a known relative location thereon, and
    B. wherein said measuring means
       (i) applies said measuring signal to each said electrode,
       (ii) responds to the response of the electrical impedance of the faceplate coating to said measuring signal applied at each said electrode, and
       (iii) identifies the location of a touch according to said responses of said plural electrodes.

12. In a display device according to claim 11, the further improvement wherein said coating is continuous along a second direction transverse to said first direction and wherein each of said first and second electrodes is elongated along a different direction.

13. In a display device according to claim 11, the further improvement wherein each of said first and second electrodes is elongated, and said electrodes are spaced apart and parallel.

14. In a display device according to claim 1, the further improvement comprising touch detection means in circuit with an electrode connected with the faceplate coating.

15. In a display device according to claim 14 the further improvement comprising a further electrode connected with said faceplate coating and in circuit with said touch detection means.

16. In a display device according to claim 1, the further improvement comprising means for selectively discharging the capacitance at said measuring electrode.

17. In a touch-responsive display device having a faceplate, the improvement comprising
    A. an unpatterned electrically-conductive coating on said faceplate,
    B. at least first and second conductive electrodes connected with the faceplate coating and disposed at known different locations thereon, each electrode having presented thereto by said faceplate coating an electrical impedance responsive to the relative distance therefrom of a capacitive touch of the faceplate, and
    C. means for identifying the spacing of a capacitive touch of the faceplate coating relative to said electrodes, said spacing-identifying means including
       (i) means for applying an impedance-measuring signal of selected character to each said electrode,
       (ii) means responsive to the response of the electrical impedance of the faceplate coating at each electrode to said measuring signal, and
       (iii) means for comparing to a reference condition the response of said coating impedance at each said electrode to said measuring signal.

18. A method for locating a capacitive touch to a display-device faceplate, said method comprising the steps of
    A. providing at least one electrode at a known relative location on the faceplate,
    B. providing an electrically-conductive coating on the faceplate connected with said electrode and extending therefrom continuously along at least a first direction, said coating presenting to said electrode an electrical impedance responsive to the relative location along said first direction of a capacitive touch of the faceplate, C. providing a reference measure of said electrical impedance presented to said electrode in response to an electrical signal applied thereto in the absence of any touch,
D. providing a further measure of said electrical impedance presented to said electrode in response to an electrical signal applied thereto when a touch is present, and
E. identifying the location of said touch along said first direction relative to said one electrode in response to a comparison of said reference and further measures.

19. A method according to claim 18 comprising the further step of discharging capacitance coupled to said electrode prior to providing said measures.

20. A method according to claim 18 in which each said measure providing step provides a measure of resistance-capacitance impedance.

21. A method according to claim 1
A. further comprising providing at least a second electrode at a known relative location on said faceplate and connected with said coating,
B. further comprising providing said reference and said further measures at said second electrode, and
C. in which said identifying step includes identifying the location of the touch relative to said second electrode in response to a comparison of said reference and comparison measures at said second electrode and providing a single location identification and in response to a combination of said identifications relative to each of said two electrodes.

22. A method according to claim 1 comprising the further step of detecting a touch to said faceplate for controlling the providing of said reference measure and of said further measure.

* * * * *

UNITED STATES PATENT AND TRADEMARK OFFICE
CERTIFICATE OF CORRECTION

PATENT NO. : 4,476,463

DATED : October 9, 1984

INVENTOR(S) : Henry H. Ng, Bela R. Hatvany

It is certified that error appears in the above-identified patent and that said Letters Patent is hereby corrected as shown below:

Column 16, line 1, change "1" to --18--.

Column 16, line 14, change "1" to --18--.

Signed and Sealed this

Thirtieth Day of July 1985

[SEAL]

*Attest:*

DONALD J. QUIGG

*Attesting Officer*     *Acting Commissioner of Patents and Trademarks*